United States Patent

Frampton et al.

[15] 3,673,251

[45] June 27, 1972

[54] PROCESS FOR THE CATALYTIC REDUCTIVE AMINATION OF NITRILES

[72] Inventors: Orville D. Frampton, Wyoming, Ohio; Joel B. Pedigo, Wheaton, Ill.; Hans Z. Lecher, Plainfield, N.J.

[73] Assignee: National Distillers and Chemical Corporation, New York, N.Y.

[22] Filed: April 30, 1969

[21] Appl. No.: 820,432

[52] U.S. Cl. .................. 260/563 D, 260/247, 260/256.4 R, 260/293.51, 260/293.63, 260/293.64, 260/296 R, 260/310 R, 260/326.8, 260/326.85, 260/465.5, 260/566 R, 260/570, 260/570 SP, 260/570.8 R, 260/570.9, 260/583 K

[51] Int. Cl. ........................................................ C07c 85/12

[58] Field of Search .............. 260/563, 583 K, 563 D; 23/2 S, 23/196

[56] References Cited

UNITED STATES PATENTS

| | | | |
|---|---|---|---|
| 1,319,663 | 10/1949 | Davis et al. .............................. 23/2 S |
| 1,787,875 | 1/1931 | Perrott et al. ............................. 23/2 S |
| 1,834,814 | 12/1931 | Wetherill ................................. 23/196 |
| 2,784,232 | 3/1957 | Terry et al. ........................... 260/583 K |
| 3,217,028 | 11/1965 | Vertnik .............................. 260/583 K |
| 3,444,205 | 5/1969 | Frohlich ............................. 260/583 K |

*Primary Examiner*—Joseph Rebold
*Assistant Examiner*—D. R. Phillips
*Attorney*—Allen A. Meyer, Jr.

[57] ABSTRACT

A cyclic process is provided for preparing secondary and/or tertiary mono-, di- or polyamines by the continuous catalytic reductive amination of mono-, di- or polynitriles, which comprises continuously hydrogenating the nitrile in the presence of a hydrogenation catalyst and a primary or a secondary mono-, di- or polyamine reactant, removing the gaseous byproduct mixture, which consists of ammonia, unreacted hydrogen and volatilized primary or secondary amine reactant, from the reaction mixture, separating the ammonia from the gaseous by-product mixture by selective absorption, and recycling the hydrogen and amine reactant.

17 Claims, 1 Drawing Figure

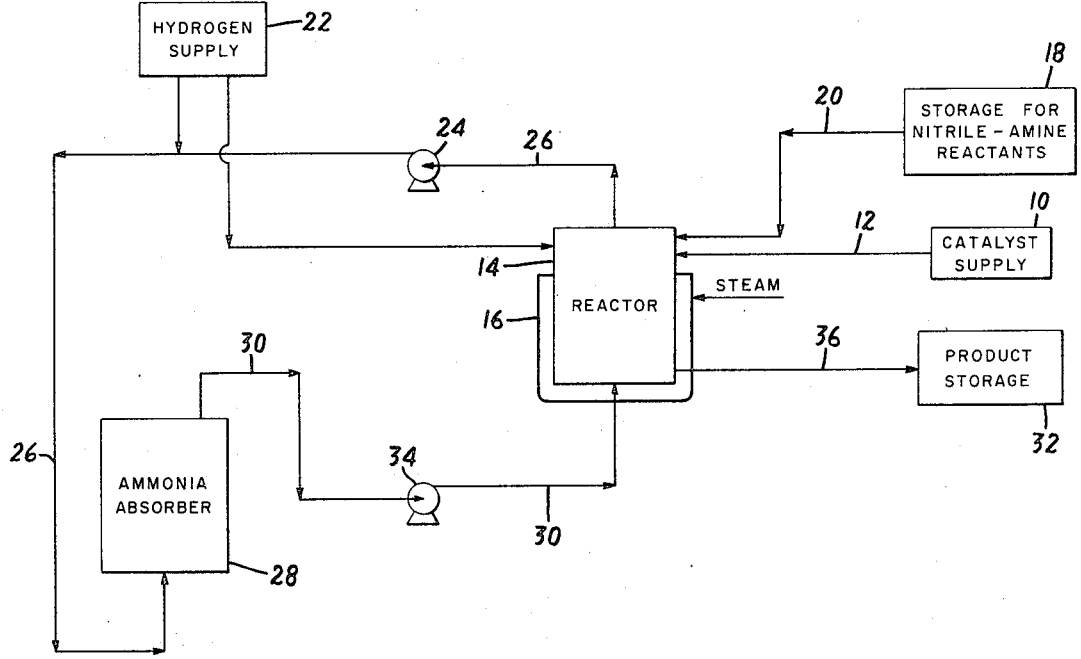

PROCESS FOR THE CATALYTIC REDUCTIVE AMINATION OF NITRILES

This invention relates to an improved process for the catalytic reductive amination of mono-, di- or polynitriles to from the corresponding secondary or tertiary mono-, di- or polyamines in the presence of a hydrogenation catalyst, and a primary or secondary amine.

A number of procedures for the catalystic reductive amination of nitriles are known. For example, U.S. Pat. No. 3,217,028 to Vertnik, dated Nov. 9, 1965, relates to the preparation of homopolymers of fatty dinitriles and copolymers of fatty dinitriles and other dinitriles. The fatty dinitrile is hydrogenated to the secondary amine in the presence of a hydrogenation catalyst, employing hydrogen pressures ranging from about 25 to 1,000 psi and temperatures ranging from about 200° to 290° C. The reaction is stated to be as follows:

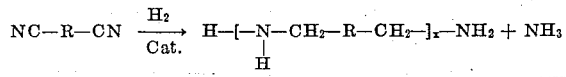

where R is a "dimeric fat" radical and $x$ is the number of recurring units in the polymer chain. To obtain optimum yields, Vertnik states that the ammonia by-product should be removed, and that this can be done by sweeping the reaction mixture with hydrogen gas.

U.S. Pat. No. 3,264,354, to Sawyer, dated Aug. 2, 1966, relates to the preparation of trialkyl tertiary amines from fatty nitriles, primary or secondary fatty amines, and mixtures of the same. The nitriles are converted to primary amine or a mixture of primary and secondary amines, employing a nickel catalyst, under a partial ammonia pressure from 30 to 70 psi, a hydrogenation pressure from 100 to 500 psi, and a reaction temperature from 200° to 300° F. By reducing or eliminating the ammonia, and using a higher reaction temperature, the proportion of primary amines is reduced, and the proportion of secondary amines is increased. Ammonia is removed as the reaction proceeds, which forces the reaction to completion to form the trialkyl tertiary amines. Sawyer does not disclose how the ammonia is removed.

Kindler et al., *Arch. Pharm.* 271 439 (1933) employ primary or secondary amines in the initial stages of catalytic hydrogenation of nitriles to prepare secondary or tertiary amines, such as epinine, hordenine and hydroxyhordenine.

Biggs et al., *Ind. & Eng. Chem.* 38 1084 (1946) disclose that in the presence of liquid methylamine, catalytic hydrogenation of adiponitrile and sebaconitrile gives rise to mixtures of methylated diamines. However, the yields of secondary amine they obtained at normal hydrogenation temperatures were never greater than 60 percent of the total amine.

Schwoegler et al., *J. Amer. Chem. Soc.* 61 3499 (1939), British Pat. No. 490,922, dated May 16, 1937, and Sasa, *J. Soc. Org. Synthet. Chem. Japan* 12 264–7 (1954) (C.A. 51 2779h) have shown that in the presence of ammonia catalytic hydrogenation of nitriles gives increased yields of primary amine.

In accordance with the instant invention, a cyclic process is provided for preparing secondary or tertiary mono-, di- or polyamines by the catalytic reductive amination of mono-, di- or polynitriles, which comprises continuously hydrogenating the nitrile in the presence of a primary or secondary amine reactant which can be added to or formed in situ in the reaction mixture and a hydrogenation catalyst, to form a gaseous phase of by-product ammonia, unreacted hydrogen, and possibly volatilized primary or secondary amine reactant, and a liquid phase of secondary or tertiary amine product, unreacted nitrile and dissolved amine reactant, wherein ammonia is continuously removed by using hydrogen gas to sweep out the ammonia in the gas phase in admixture with unreacted hydrogen and volatilized amine reactant, separating the ammonia from such reactants, such as by contact with a selective ammonia absorbent, and wherein the separated reactant gases are recycled to the liquid phase where together with the feed they replenish the hydrogen and amine reactant to the reaction mixture and wherein secondary amine or tertiary amine product is continuously removed from the liquid phase.

The continuous recycling of the reaction gases in this way makes it possible to continuously remove ammonia during the reaction as it is formed, keeping the reaction system substantially free from ammonia, thus driving to completion the reaction to form secondary amine or tertiary amine, and inhibiting the formation of undesirable primary amines.

The reaction proceeds in good yield, in accordance with the following reactions, wherein a mono-, di-, or polynitrile is employed and a primary or secondary amine reactant is added to the reaction mixture:

(1)
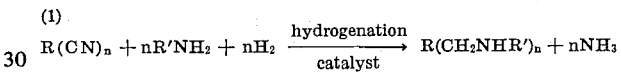

(2)
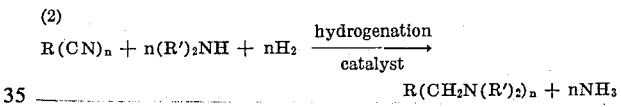

R is an organic radical, such as a straight chain or branched chain aliphatic, cycloaliphatic, aromatic or heterocyclic radical having from about one to about 30 carbon atoms.

$n$ is a number from 1 to 40, inasmuch as mononitriles and polynitriles can be hydrogenated. If the nitrile is a polynitrile, R is a polyvalent straight chain or branched chain aliphatic, cycloaliphatic, aromatic or heterocyclic radical.

R' is an organic radical, such as a straight or branched chain aliphatic, cycloaliphatic, aromatic or heterocyclic radical having from about one to about 30 carbon atoms.

Under certain hydrogenation conditions, as will be described hereinafter, one or more nitrile groups of a polynitrile can be reduced to secondary or tertiary amine groups.

Polynitriles containing two or more nitrile groups form polyamines. The polynitriles have a polymeric unit or base polymer chain with a number of CN groups attached thereto as side groups, of the type

wherein $n_2$ is an integer from about 2 to about 40. Examples of typical reactions employing various polynitriles as starting materials to form secondary or tertiary polyamines in good yield, are as follows:

(3)
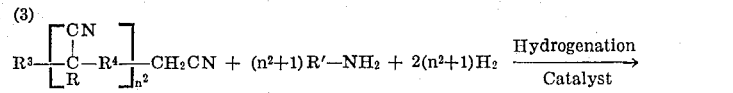

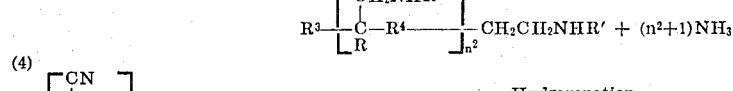

(4)
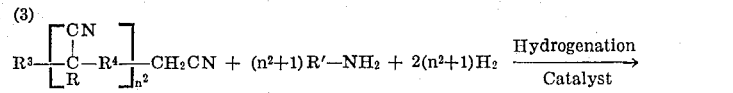

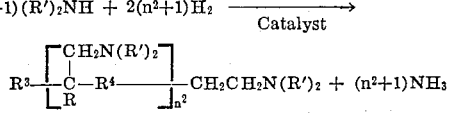

(5)
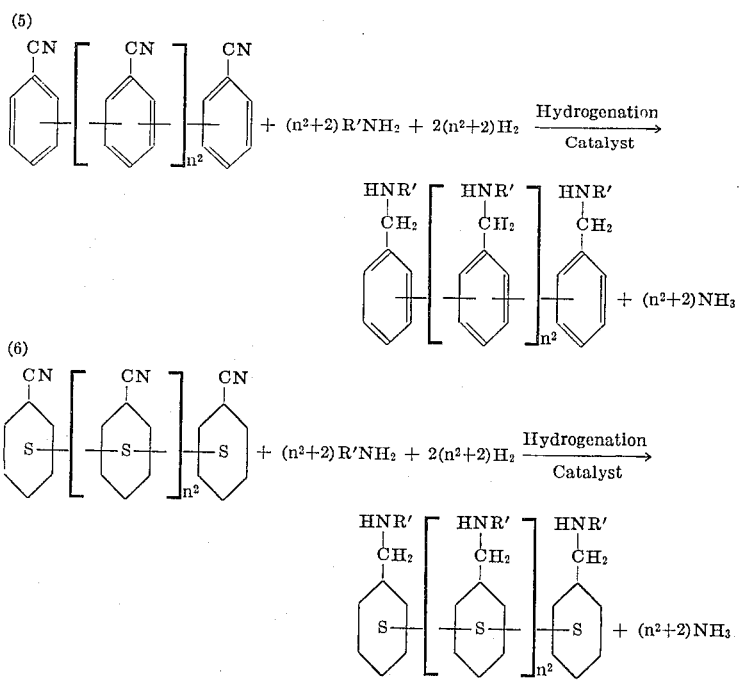

(6)

wherein R', R³ and R⁴ are organic radicals of the same type as R and R' defined hereinbefore, and $n^2$ is an integer from about 2 to about 40.

Secondary polyamines can be formed in accordance with the following reaction which is disclosed in U.S. Pat. No. 3,217,028:

(7)
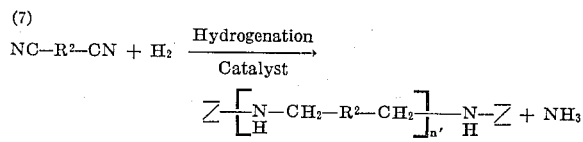

wherein R² is a bivalent aliphatic radical having from about eight to about twenty-four carbon radicals, $Z$ is H or $-CH_2-R-CN$, wherein R² is as defined hereinbefore with respect to R, and $n'$ is within the range from about 2 to about 40. Secondary amine forming conditions as will be described hereinafter are employed in carrying out this reaction. The dinitrile is hydrogenated and the corresponding dialdimine and primary diamine are formed in situ and these interact to form the secondary polyamine with elimination of ammonia. The ammonia is removed from the reaction mixture in accordance with the invention by employing hydrogen to sweep out the gas phase containing the ammonia in admixture with unreacted hydrogen; the ammonia is separated from the hydrogen-ammonia gas mixture by contacting the mixture with a selective ammonia absorbent; and the hydrogen is recycled.

The above reactions (1) to (7) represent overall reactions, which encompass a series of initial, intermediate and final reactions. The following series of reactions occur in the reductive amination of a mononitrile.

In the initial reaction, the nitrile is probably hydrogenated to an aldimine:

(8)
$$RCN + H_2 \xrightarrow{\text{hydrogenation catalyst}} RCN=NH$$

The aldimine then reacts with the primary or secondary amine to give intermediate addition products:

(9) $RCH=NH + R'NH_2 \longrightarrow RCH(NH_2)NH(R')$

(10) $RCH=NH + (R')_2NH \longrightarrow RCH(NH_2)N(R')_2$

The intermediates are converted to the corresponding secondary or tertiary amines by hydrogenation, yielding ammonia as a by-product:

(11)
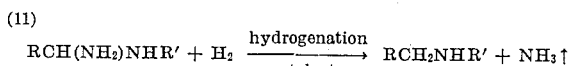

(12)
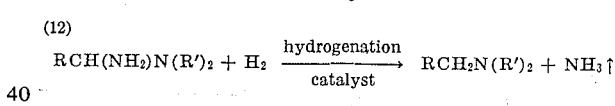

Unless the ammonia is removed, it reacts with the aldimine, yielding an intermediate addition product which is converted to a primary amine, again liberating ammonia:

(13) 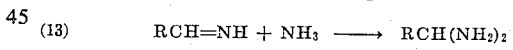

(14) 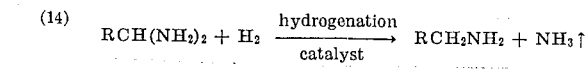

In accordance with the instant invention, any ammonia liberated is continuously removed, thereby keeping the reaction system free from ammonia, and inhibiting the formation of primary amines by reactions such as (13) and (14), while driving to completion the desired reaction to form secondary and tertiary amines. Then, the ammonia is separated from the reactant gases, which are recycled. As a result of these expedients, the process is operable continuously, which is of a considerably advantage commercially, and the secondary or tertiary amine product can also be removed continuously from the reaction mixture, as it is formed.

The process is applicable to a large class of mononitriles, dinitriles or polynitriles to prepare the corresponding secondary of tertiary amines. The mononitriles and polynitriles have the general formula:

$$R(CN)_n$$

$n$ is 1 to 40. R is monovalent when $n$ is 1 and polyvalent when $n$ is 2 or more, and is a straight chain or branched chain aliphatic, cycloaliphatic, aromatic or heterocyclic radical having from one to about 30 carbon atoms.

Thus, R can be alkyl, alkenyl, cycloalkyl, cycloalkenyl, aryl, alkaryl, aralkyl, alkylene, arylene, and cycloalkylene.

Monovalent R radicals include methyl, ethyl, propyl, isopropyl, butyl, sec-butyl, tert-butyl, isoamyl, hexyl, octyl, isooctyl, 2-ethyl-hexyl, nonyl, tetradecyl, octadecyl, lauryl, decyl, palmityl, stearyl, oleyl, linoleyl, ricinoleyl, valeryl, allyl, phenyl, 4-tert-butylphenyl, 2-methyl-4-tert-butylphenyl, benzyl, α- and β-phenethyl, o-xylyl, p-xylyl, tolyl, naphthyl cyclopentyl, cyclohexyl, and cyclooctyl, cyclopentenyl, pyrryl, pyrrolidyl, and pyrazolyl.

Typical bivalent R radicals include:

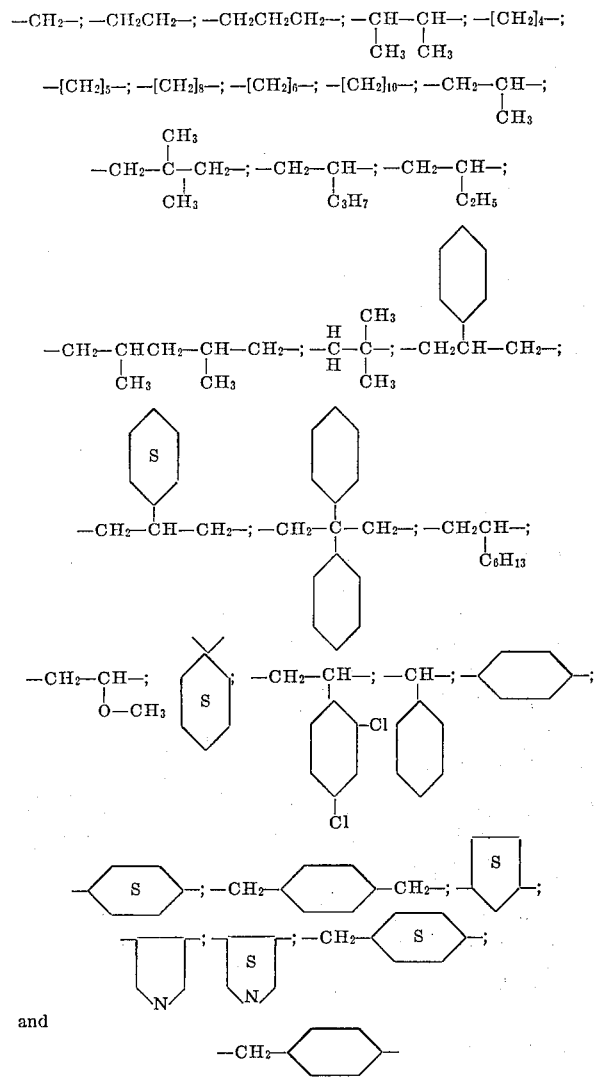

Such radicals may, if desired, contain inert, nonreactive substituents such as halogen and other carbocyclic and heterocyclic ring structures condensed therewith.

Exemplary mono- and dinitriles which undergo the process of the invention include acrylonitrile, methacrylonitrile, ethacrylonitrile, acetonitrile, propionitrile, allyl cyanide, n-butyronitrile, isopropionitrile, isobutyronitrile, valeronitrile, cyclohexanenitrile, benzonitrile, oleonitrile, dodecanenitrile, crotonitrile, 2-napthonitrile, cyclopentanenitrile, cyclopentenenitrile, 3-pyrrolenitrile, 3-pyrrolidinenitrile, 5-pyrimidinecarbonitrile, adiponitriole, glutaronitrile, suberonitrile, sebaconitrile, succinoitrile, α-methylene-glutaronitrile, 2-methyl glutaronitrile (1,3-dicyanobutane) itacononitrile, α-methylene-adiponitrile, α-methylene-suberonitrile, α-methyleneazelaonitrile, α-methylene-sebaconitrile, fumaronitrile, malononitrile, pimelonitrile, atroponitrile, cinnamonitrile, terephthalonitrile, isophthalonitrile, trimesonitrile, cyclopentene dinitrile, cyclohexene dinitrile, 3,5-pyrroledinitrile, and 3,5-pyrrolidinedinitrile.

Polynitriles which can be employed can contain from about two to about 40 CN side chain units, of the following type:

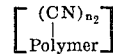

Examples of recurring units containing CN side chains include:

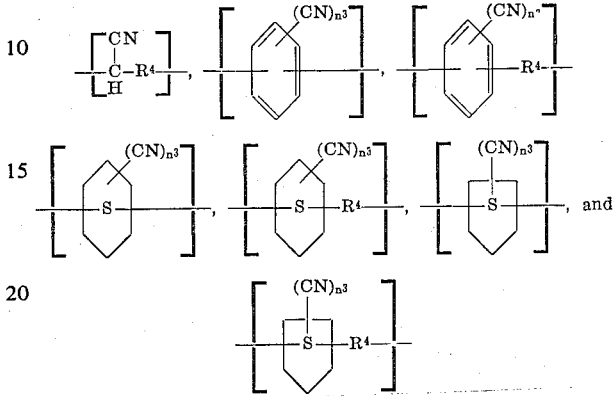

wherein $R^4$ can be a straight or branched chain aliphatic, cycloaliphatic or aromatic radical having from one to about thirty carbon atoms, and $n^3$ is an integer within the range from 1 to about 4. Typical $R^4$ radicals include any of the bivalent R radicals set out above with respect to nitriles. These recurring units can be linked in a chain with other recurring units or linking groups such as —O—, —S—, or any of the bivalent radicals set out with respect to nitriles.

Examples of polynitriles suitable for use herein include polyacrylonitrile, polymethacrylonitrile, polyitaconotrile, polyphenylnitrile, poly-2-napthonitrile, polyisophthalonitrile, polytrimesonitrile, polycyclohexylnitrile, polycyclopentylnitrile, 1,1-dicyanobicyclohexl, 1,1'-dicyanobiphenyl-3,3',and polymers of any of the nitriles set out hereinbefore.

The primary and secondary amines suitable for use in the process of the invention have the general formulas:

$R'NH_2$ and $R_2'NH_2$ wherein $R'$ is a straight chain or branched chain aliphatic, cycloaliphatic or aromatic radical having from one to about thirty carbon atoms as defined hereinbefore with respect to monovalent R.

Examples of primary and secondary amines which can be used in the process of the invention include methylamine, ethylamine, propylamine, isopropylamine, butylamine, isoamylamine, amylamine, tert-amylamine, 2-aminohexane, n-butylamine, sec-butylamine, isobutylamine, allylamine, N-methylallylamine, pyrrolidine, isoamylamine, hexylamine, cyclohexylamine, cyclooctylamine, cyclopentylamine, 2-aminopyrrole, 2-aminopyrrolidine, 2-aminopyridine, 5-aminomethylpyrimidine, tridecylamine, piperidine, aniline, N-methylbenzylamine, benzylamine,n-heptylamine, α-phenethylamine, methylethylamine, diethylamine, dimethylamine, ethylpropylamine, di-n-propylamine, methylbutylamine, diisopropylamine, dibutylamine, propylallylamine, diallylamine, phenylbenzylamine, N-methylaniline, o-, m- or p-ethylaniline, N-isobutylaniline, methylpropylamine, diisobutylamine, cyclohexyl-heptyl-amine, ethylene diamine, morpholine, o-, m- or p-phenetidine, o-, m- or p-anisidine, o-, m- or p-toluidine, N-methyl-o-toluidine, N-ethyl-p-toluidine, 2-amino-1,4-dimethyl-benzene, 2-amino-1,3-dimethyl benzene, 3-methylaminopyrrole and 3-ethylaminopyrrolidine.

Other nitriles and primary or secondary amines which can be employed in the process of the invention will be apparent to those skilled in the art.

Generally, any hydrogenation catalyst can be employed in accordance with the invention. Preferred catalysts are palladium or palladium on carbon. Other suitable catalysts include Raney nickel, copper chromite, Raney cobalt, cobalt on kieselguhr, platinum, platinum on charcoal, nickel on kieselguhr, copper nickel carbonate, cadmium copper zinc chromite, copper nickel oxide, and the like. The catalyst can be employed in any particulate form such as powder or pelleted. If the catalyst is employed in powdered form, it is preferred to employ a filter aid, such as diatomaceous earth, to aid in subsequent filtration in removing the catalyst from the product.

Ammonia can be separated from mixtures of ammonia, and unreacted volatile primary or secondary amine reactant by contacting the mixtures with a selective absorbent for ammonia which can be a particulate solid reactive with ammonia and inert to the other reaction gases present, such as hydrogen, the amine reactant or product. Generally, the absorbent should be a neutral salt capable of forming ammoniates or ammines with ammonia. Solid anhydrous calcium chloride is preferred, since it easily forms the solid ammoniate $CaCl_2 \cdot 2NH_3$ with $NH_3$ gas. Other ammoniate or ammine forming agents can be employed, including silver chloride, silver iodide, silver chlorate, silver bromate, silver nitrate, silver nitrite, silver chromate, silver selenate, silver sulfate, silver pyrosulfate, silver arsenite, cupric chloride, cupric sulfate, cupric molybdate, cupric bromide, cupric sulfate pentahydrate, cupric iodide, cupric nitrate, cupric thiocyanate, cupric nitrite, mercuric chloride, mercuric iodide, mercuric bromide, mercuric oxide, barium chloride, barium sulfate, calcium chloride, calcium sulfate, calcium iodide, calcium bromide, calcium carbonate, magnesium iodide, magnesium sulfate, magnesium chloride, magnesium chlorate, magnesium nitrate, manganese sulfate, manganese iodide, manganese chloride, nickel chloride, nickel iodide, nickel sulfate, nickel bromide, lead iodide, zinc sulfate, zinc carbonate, zinc chloride, zinc molybdate, zinc iodide, zinc nitrate, zinc bromide, ferric chloride, ferrous iodide, ferrous sulfate, antimony trichloride, antimony pentachloride, cadmium sulfate, cadmium iodide, cadmium chloride, cadmium bromide, platinum chloride, cobaltous chloride, cobaltous iodide, cobaltous sulfate sodium cobaltinitrite, chromic nitrate, chromic chloride, aurous chloride, aluminum iodide, aluminum chloride, stannic iodide, stannous chloride, stannous bromide, stannous iodide, zirconium chloride, bismuth chloride, bismuth iodide, arsenous fluoride, arsenous chloride, phosphorus pentachloride.

Where the primary or secondary amines employed are not volatile so that the ammonia need only be separated from hydrogen, other types of absorbents can be used, such as water, supported phosphoric acid (on silica gel or diatomaceous earth), acid salts such as alkali and alkaline earth metal halides, carbonates, sulfates or phosphates including magnesium chloride, barium sulfate, calcium carbonate and potassium phosphate, acid solutions such as phosphoric acid, sulfuric acid, hydrochloric acid.

In one process of the invention, where a catalyst slurry is employed, hydrogenation catalyst, nitrile, hydrogen, and primary or secondary amine reactant are continuously fed to a reactor vessel which is pressurized with hydrogen at the desired pressure and heated to reaction temperature. The gas phase comprises unreacted hydrogen and ammonia by-product, and can include amine reactant and nitrile volatile at reaction temperatures. The liquid phase comprises secondary or tertiary amine reaction product, dissolved unreacted amine reactant or nitrile, dissolved ammonia, and catalyst. During the reaction, the gas phase is continuously swept out of the reactor, replenishing reactants withdrawn with recycle gas which is substantially free from ammonia, and with feed reactants. The gases that are withdrawn are passed through an absorbent for ammonia, whereby ammonia is selectively absorbed. The remaining gases are continuously blended with hydrogen, recycled to the reactor vessel, and through the reaction mixture (the liquid phase), sweeping dissolved ammonia into the gas phase above. Hydrogen, nitrile and amine consumed by the reaction are continuously replaced so that the liquid phase of the reaction product is kept substantially saturated with hydrogen and amine reactant. An amount of the liquid phase corresponding to liquid fed in to replenish nitrile and amine is continuously removed from the reaction vessel.

The dwell time in the reactor is long enough to ensure substantially complete conversion of nitrile. This can be ascertained by measuring hydrogen absorption rate of the reaction mixture. The liquid phase is continuously removed from the reactor, through a filter to separate the catalyst from the reaction mixture and the amine products isolated therefrom by any conventional technique, such as fractional distillation.

Catalyst is also removed continuously at a rate determined by its loss in activity. Fresh catalyst is fed at this same rate. In an alternate method the reaction is packed with particulate supported catalyst bed and liquid reactants allowed to trickle over the catalyst bed and out of the reactor. Filtration is not necessary. Where elevated reaction temperatures are employed, a large portion of the amine reactant may volatilize from the liquid phase to become a part of the gas phase until equilibrium is established between the gas and liquid phases. Normally, this is undesirable. However, to reduce this tendency, it is preferred that the reaction be carried out under elevated pressures, such as, for example, 100 to 4,000 psig to inhibit volatilization of the amine from the liquid phase.

If the primary or secondary amine reactant is normally volatile, or if it is volatile at reaction temperature, unreacted amine along with the rest of the gas phase is kept in the gaseous state and passed through the absorbent selective for ammonia. Such volatile amines should be inert and unreactive with absorbent for the ammonia, so that the unreacted amines can be returned to the liquid phase of the reaction product. If nonvolatile amines are employed, the unreacted amines generally remain in the liquid phase, and are not removed in the gas phase, so that they can be separated by fractional distillation of the liquid phase and then recycled. However, ammonia in the gas phase is separated from hydrogen by the selective absorbent, and the hydrogen recycled.

The ratio of primary or secondary amine reactants to nitrile reactant employed in the process should be high enough to ensure a relatively complete reaction, and thus should be within the range from about 1 to about 16 moles of amine per mole of nitrile, and preferably within the range from about 4 to about 10 moles amine per mole of nitrile. Under normal conditions of reaction, the amine and nitrile reactants should be in the liquid phase. If the primary or secondary amine is a liquid, the nitrile, whether it be solid or liquid, should be soluble in the amine. If it is not, a liquid solvent which is inert to the amine and nitrile, and in which the amine and nitrile are soluble, should be employed. A solvent should also be employed if the primary or secondary amine is a solid under reaction conditions. Examples of solvents suitable for use include alcohols, esters and ethers, such as ethanol, ethyl acetate and n-propyl ether or dioxane, chlorinated hydrocarbons such as chloroform or aromatic hydrocarbons such as benzene or toluene.

The reaction proceeds at room temperature, but proceeds more rapidly at elevated temperatures. A suitable rate of reaction is obtained at temperatures within the range from about 50° C to about 300° C. There is no upper limit, except that imposed by the critical temperature of the reactants and the solvents, the pressure limitations of the reaction vessel or the stability of the reaction products and of the reactants. Preferred temperatures are within the range from about 100° to about 150° C. If it is desired to reduce both nitrile groups of a dinitrile reactant, it is preferred to employ temperatures within the range from about 100° to about 150° C. If it is desired to prepare a polymeric secondary amine as defined hereinbefore, temperatures ranging from about 200° C to about 290° C can be employed.

The dwell time necessary to ensure a substantially complete reaction depends on several factors, including reaction temperature, the type and concentration of catalyst employed, the age of the catalyst, the hydrogen pressure, and the concentration and types and ratio of reactants employed. Generally, under the reaction conditions set out herein, a substantially complete reaction can be obtained, were the catalyst is being used for the first time, within about 15 minutes. There is no upper limit on the reaction time except as determined by the economics of the process. Thus, dwell reaction times as high as 18 hours can be satisfactorily employed, especially where the catalyst has been reused several times. If a dinitrile is employed and it is desired to reduce the dinitrile all the way to a secondary or tertiary diamine, reaction times within the range from about 0.25 to about 18 hours can be employed.

Where the continuous phase is liquid and slurries of catalyst are employed, the hydrogenation catalyst for nitrile reduction can be employed in the usual amounts for such reaction, such as, for example, within the range from about 0.1 to about 10 percent, and preferably within the range from about 3 to about 8 percent by weight of the nitrile to be reduced. Preferably, from about 3 to about 8 percent is used, if both nitrile groups of a dinitrile are to be reduced. Where the continuous phase is gaseous and liquid is trickled over the catalyst, the ratio of catalyst to substrate is extremely high and depends on the trickle flow rate which is generally fixed by the viscosity of the reaction mixture and catalyst size and surface properties.

Hydrogen is used in excess, to give the desired pressure. The hydrogen pressure can be within the range from about 150 to about 10,000 psig, and preferably within the range from about 600 to about 5,000 psig.

In order to ensure that the continuous process of the invention is carried out efficiently so that high yields of secondary or tertiary amine products are obtained, the mixture of the amine reactant and nitrile should be introduced into the reaction vessel at a flow rate from about 0.05 to about 5 gal./hr./gal. reactor and preferably from about 0.15 to about 2.8 gal./hr./gal. reactor and the hydrogen should be introduced at a flow rate from about 0.03 to about 3 and preferably from about 0.1 to about 1.7 SCFM/gal. reactor volume, wherein SCFM refers to standard (60° F. — 1 atm.) cubic feet per minute.

Where the continuous phase is liquid, the catalyst can be present as a slurry of catalyst powder in reaction liquid, or where the continuous phase is gas, the catalyst can be supported catalyst with liquid reactants trickling down over the catalyst bed which is surrounded by a gas phase which includes hydrogen.

The rate of circulation of the gas phase is adjusted to sweep out ammonia virtually as rapidly as it is formed, and to replenish hydrogen and amine reactant as they are consumed, as well as to provide a simple means for agitation of the reaction mixture, especially in systems where the continuous phase is liquid. Flow rates of from 0.1 to 10 SCFM/gal. reactor volume are quite satisfactory, and flows of from 0.3 to 5 SCFM/gal. reactor volume are preferred.

The flow sheet of the attached FIGURE represents a typical continuous process of the invention wherein the continuous phase is liquid.

In starting up the continuous process shown in the attached Figure, the catalyst from supply 10 together with diatomaceous earth as a filter aid are passed through line 12 into a reactor vessel 14 containing a steam jacket 16. Into the reactor (which has previously been purged with nitrogen and evacuated) is fed a solution of a mono- or dinitrile and a primary or secondary amine, from storage tank 18 through line 20. The reactor is then pressurized with hydrogen from reservoir 22 to the desired hydrogen pressure, and heated with steam to the reaction temperature. After reaction has begun, recycling of the gas phase is begun. Gas is removed from the reactor by pump 24 through line 26, passed through ammonia absorbent bed 28 containing particulate calcium chloride, wherein ammonia is selectively absorbed, and the remaining gases comprising hydrogen, any amine reactant, and substantially no ammonia are pumped via pump 34 through line 30 back into the reactor 14. The recycled gases, which have been replenished with hydrogen from hydrogen reservoir 22, are swept through the reaction mixture (liquid phase) present in the reactor 14 at a suitable rate to replenish the hydrogen supply in the reactor, and sweep dissolved ammonia from the liquid phase as it is formed. At the same time, reactant nitrile and amine are fed into the system via line 20, and reaction solution is withdrawn at the same rate, filtered through a porous metal disc filter at the bottom of the reactor, to remove catalyst, led through line 36, and stored in product storage 32. The amine reaction product can then be recovered by fractional distillation. The catalyst remains in the reactor, and can be used for a considerable period of time, usually several weeks or months, depending on production volume, before needing replenishment.

The flow sheet of the Figure is applicable also to a trickle phase system except that catalyst is not supplied from catalyst supply 10. In this case the catalyst is supported on pellets or extrusions and placed into reactor vessel 14 prior to reaction. The reactant amine and nitrile are fed continuously into the system via line 20, enter the reactor at the top and are allowed to trickle over the bed and to form a liquid level just below the catalyst bed. The liquid is drawn off continuously through line 36 at such a rate as to maintain the liquid level, and stored in product storage 32. The rest of the system operation is as previously described.

The following examples in the opinion of the inventors represent preferred embodiments of their invention.

EXAMPLE 1

2-Methyl-5-diethylamino valeronitrile was continuously prepared, starting from 1,3-dicyanobutane and diethylamine, following the sequence of operations shown in the Figure.

To start up, a hydrogenation catalyst comprising 5 percent palladium on carbon powder (2.5 parts) and diatomaceous earth (2.5 parts Johns Manville Hyflo Supercel) was fed into a pressure reactor equipped with a steam jacket, which was then closed. The reactor was purged twice with substantially pure nitrogen, and evacuated between purges. The system was then brought to a pressure of 350 psig. with hydrogen, except for the reactor, which was isolated by valves and left under vacuum. 95 parts of reactant solution comprising 1,3-dicyanobutane dissolved in diethylamine in a mole ratio of 1,3-dicyanobutane: diethylamine of 1:2 was then introduced into the reactor. The reactor then was brought to and maintained at a pressure of 350 psig. with hydrogen, and heated to a temperature of about 104° C by steam, for about 15 min. Withdrawal of ammonia and recycle of the gas phase was then begun. The gas phase (hydrogen, unreacted amine and ammonia by-product) was pumped out of the top of the reactor at a rate of 8 SCFM/gal. reactor volume and continuously passed through a bed of calcium chloride (30 mesh granules) in order to remove ammonia from the gases. Gases collected from the calcium chloride bed were continuously pumped back into the reactor, through a porous metal disc at the bottom of the reactor, and bubbled through the liquid phase present in the reactor at the same rate as the rate of withdrawal to thereby replenish hydrogen and sweep dissolved ammonia from the liquid phase and saturate the liquid phase with hydrogen and amine reactant.

At the same time, nitrile and amine were fed to the system at a rate of 4.28 gal./hr./gal. reactor volume in the same molar ratio as before. Dwell time in the reactor was 14 min. The liquid phase reaction mixture was withdrawn from the reactor through the porous metal disc at the same rate.

The product solution obtained was analyzed by gas-liquid chromatography in a 6 ft. × ¼ in. column which was designed for the separation of amines. This column contained acid washed 30–60 mesh Chromosorb W support with 10 percent KOH/20 percent Apiezon as substrate as described by L.D. Metcalf et al. in *J. Gas Chromatography* 2 No. 1 15 (1964).

The gas liquid chromatography conditions employed were as follows:

Injector temperature                      220°C

| Column temperature | 140°C |
| --- | --- |
| Detector temperature | 150°C |
| Filament current | 200 milliamperes |

Helium gas at 23 psig. inlet pressure with a flow of 300 ml./min.

The following retention times were observed:

2.7 minutes for 1,3-dicyanobutane 7.2 minutes for 2-methyl-5-diethylamino valeronitrile 15.5 minutes for 2-methyl-1,5-bis N,N-diethylaminopentane 22 minutes for N-(2-methyl-4-cyanobutyl)-3-methyl-piperidine.

Examination of the chromatogram indicated that very little, if any, of undesirable primary amines which could be expected to be formed from undesirable side reactions, namely, 2-methyl-5-amino valeronitrile and 2-methyl-1,5-diaminopentane, were formed.

The yield of 2-methyl-5-diethylamino valeronitrile was about 88.6percent. In addition, yields of 2-methyl-1,5-bis-N,N-diethylaminopentane and N-(2-methyl-cyanobutyl)-3-methyl-piperidine of 3.5percent and 2.8 percent, respectively, were obtained. The reaction product also included 5.8 percent of unreacted 1,3-dicyanobutane.

EXAMPLE 2

2-Methyl-5-diethylamino valeronitrile was continuously prepared employing the apparatus as described in Example 1 and schematically shown in FIG. 1 and employing 1,3-dicyanobutane and diethylamine in a molar ratio of 1,3-dicyanobutane:diethylamine of 1:2 using the 5 percent palladium on carbon hydrogenation catalyst which had been used in Example 1.

Reaction was begun by running in 95 parts of the nitrileamine reactant solution, first evacuating the reactor, and then allowing the reactant solution to flow in under about 5 lb. nitrogen pressure.

The reactor was pressurized to about 350 psig. with hydrogen, and heated to 104° C with steam. Dwell time in the reactor was 54 min., obtained by adjustment of the feed rate of reactants and rate of withdrawal of reaction solution. Withdrawal and recycling of the gas phase was begun after 10 min. of reaction. The gas phase was continuously pumped out of the reactor at a rate of 2 SCFM/gal. reactor volume, and passed over the calcium chloride bed to remove ammonia therefrom. The treated gases were continuously recycled to the reactor after replenishment with hydrogen, and bubbled through the liquid phase portion of the reaction mixture to sweep dissolved ammonia from such liquid phase.

The liquid reaction product was forced out of the reaction vessel under hydrogen pressure, and was analyzed by gas-liquid cromatography, as described in Example 1.

A yield of about 83.7 percent of 2-methyl-5 - diethylaminovaleronitrile was obtained. Yields of 2-methyl-1,5-bis-N,N'-diethylaminopentane and N-(2-methyl-4-cyanobutyl)-3methyl-piperidine of 3.9 percent and 1.9 percent, respectively, were also obtained. In addition, about 10.5 percent by weight of the recovered product was unreacted 1,3-dicyanobutane.

EXAMPLE 3

2-Methyl-1,5-bis-N,N-diethylaminopentane was continuously prepared starting from 1,3-dicyanobutane and diethylamine, following the sequence of operations shown in FIG. 1.

In starting up, a hydrogenation catalyst comprising 5 percent palladium on carbon powder (2.5 g) and diatomaceous earth (2.5 g Johns Manville Hyflo Supercel) was disposed in a pressure reactor equipped with a steam jacket, which was then closed. The reactor was purged twice with substantially pure nitrogen, and evacuated between purges. The system was then brought to a pressure of 350 psig. with hydrogen, except for the reactor, which was isolated by valves and left under vacuum. 95 parts of reactant solution comprising 1,3-dicyanobutane dissolved in diethylamine in a mole ratio of 1,3-dicyanobutane:diethylamine of 1:2 was introduced into the reactor. The reactor was brought to and maintained at a pressure of 150 psig. with hydrogen, and heated to a temperature of about 105°–115° C by steam. Dwell time in the reactor was about 272 min.; the feed rate of nitrile and amine in the same molar ratio and the rate of withdrawal of reaction solution being adjusted to accomplish this.

The gas phase comprising hydrogen, unreacted amine and ammonia by-product, was pumped out of the top of the reactor at a rate of 0.4 SCFM/gal. reactor volume and continuously passed through a calcium chloride bed in order to remove ammonia from the gases. Gases collected from the calcium chloride bed were replenished with hydrogen at a rate of 0.26 SCFM/gal. reactor volume and continuously pumped back into the reactor through a porous metal disc at the bottom of the reactor and bubbled through the liquid phase present in the reactor, to thereby sweep dissolved ammonia from the liquid phase and saturate the liquid phase with hydrogen.

3.87 moles hydrogen were consumed per mole of 1,3-dicyanobutane. The theoretical hydrogen consumption to produce 2-methyl-1,5-bis-N,N-dimethylaminopentane is 4 moles.

Analysis of the reaction mixture by gas liquid chromatography as described hereinbefore indicated at 39.8 percent yield of 2-methyl-5-diethylamino valeronitrile and a 60.1 percent yield of 2-methyl-1,5-bis-N,N-dimethylaminopentane.

EXAMPLE 4

1,1'-Di(N-dimethylaminomethyl)bicyclohexyl is continuously prepared starting from 1,1'dicyanobicyclohexyl and dimethylamine, following the sequence of operations shown in FIG. 1.

In starting up, a hydrogenation catalyst comprising 5 percent palladium on carbon powder (2.5 g.) and diatomaceous earth (2.5 g Johns Manville Hyflo Supercel) is disposed in a pressure reactor equipped with a steam jacket, which is then closed. The reactor is purged twice with substantially pure nitrogen, and evacuated between purges. The system is then brought to a pressure of 350 psig. with hydrogen, except for the reactor, which is isolated by valves and left under vacuum. Reactant solution comprising 1,1'-dicyanobicyclohexyl (35 g.) dissolved in dimethylamine in a mole ratio of 1,1'-dicyanobicyclohexyl:dimethylamine of 1:2 is introduced into the reactor. The reactor is brought to and maintained at a pressure of 150 psig. with hydrogen, and heated to a temperature of about 105°–115° C. by steam. Dwell time in the reactor is about 272 min.; the feed rate of nitrile and amine in the same molar ratio and the rate of withdrawal of reaction solution is adjusted to accomplish this.

The gas phase comprising hydrogen, unreacted amine and ammonia by-product is pumped out of the top of the reactor at a rate of 0.4 SCFM/gal. reactor volume and is continuously passed through a calcium chloride bed in order to remove ammonia from the gases. Gases collected from the calcium chloride bed are replenished with hydrogen at a rate of 0.26 SCFM/gal. reactor volume and continuously pumped back into the reactor through a porous metal disc at the bottom of the reactor and bubbled through the liquid phase present in the reactor, to thereby sweep dissolved ammonia from the liquid phase and saturate the liquid phase with hydrogen.

The liquid product contains predominantly, 1,1'-di(N-dimethylaminomethyl)bicyclohexyl.

EXAMPLE 5

1,1'-Di(N-methylaminomethyl)biphenyl-3,3' is continuously prepared starting from 1,1-dicyanobiphenyl-3,3' and methylamine, following the sequence of operations shown in FIG. 1.

In starting up, a hydrogenation catalyst comprising 5 percent palladium on carbon powder (2.5 g) and diatomaceous earth (2.5 g Johns Manville Hyflo Supercel) is disposed in a pressure reactor equipped with a steam jacket, which is then closed. The reactor is purged twice with substantially pure nitrogen, and evacuated between purges. The system is then brought to a pressure of 350 psig. with hydrogen, except for the reactor, which is isolated by valves, and left under vacuum. Reactant solution comprising 1,1'-dicyanobiphenyl-3,3' (35 g.) dissolved in methylamine in a mole ratio of 1,1'-dicyanobiphenyl-3,3':methylamine of 1:2 is introduced into the reactor. The reactor is brought to and maintained at a pressure of 150 psig. with hydrogen, and heated to a temperature of about 105°–115° C. by steam. Dwell time in the reactor is about 272 min.; the feed rate of nitrile and amine in the same molar ratio and the rate of withdrawal of reaction solution is adjusted to accomplish this.

The gas phase comprising hydrogen, unreacted amine and ammonia by-product, is pumped out of the top of the reactor at a rate of 0.4 SCFM/gal. reactor volume and is continuously passed through a calcium chloride bed in order to remove ammonia from the gases. Gases collected from the calcium chloride bed are replenished with hydrogen at a rate of 0.26 SCFM/gal. reactor volume and continuously pumped back into the reactor through a porous metal disc at the bottom of the reactor and bubbled through the liquid phase present in the reactor, to thereby sweep dissolved ammonia from the liquid phase and saturate the liquid phase with hydrogen.

The liquid product contains predominantly, 1,1'-di(N-methylaminomethyl)biphenyl-3,3'.

EXAMPLE 6

Polymeric secondary amine is continuously prepared starting from 1,3-dicyanobutane.

In starting up, a hydrogenation catalyst comprising reduced 55 percent cobalt on kieselguhr (2.5 g) and diatomaceous earth (2.5 g Johns Manville Hyflo Supercel) is disposed in a pressure reactor equipped with a steam jacket, which is then closed. The reactor is purged twice with substantially pure nitrogen, and evacuated between purges. The system was then brought to a pressure of 150 psig. with hydrogen, except for the reactor, which is isolated by valves and left under vacuum. 35 grams of reactant comprising 1,3-dicyanobutane is introduced into the reactor. The reactor is brought to and maintained at a pressure of 230 psig. with hydrogen, and heated to a temperature of about 270° C. by steam. Dwell time in the reactor is about 90 min. During the reaction, 2-methyl-1,5-diaminopentane forms in situ in the reaction mixture and reacts with the dinitrile reactant to form polymeric secondary amine products.

The gas phase comprising hydrogen and ammonia by-product, is pumped out of the top of the reactor at a rate of 0.4 SCFM/gal. reactor volume and continuously passed through a calcium chloride bed in order to remove ammonia from the gases. Gases collected from the calcium chloride bed are replenished with hydrogen at a rate of 0.26 SCFM/gal. reactor volume and continuously pumped back into the reactor through a porous metal disc at the bottom of the reactor and bubbled through the liquid phase present in the reactor, to thereby sweep dissolved ammonia from the liquid phase and saturate the liquid phase with hydrogen.

The product comprises polymeric secondary amine containing 10 percent primary amine groups, 85 percent secondary amine groups and 5 percent tertiary amine groups.

EXAMPLE 7

2-Methyl-5-diethylaminovaleronitrile was continuously prepared in a trickle reactor system wherein the continuous phase was gaseous as described below. A jacketed stainless steel pressure reactor measuring 1¼ inches inside diameter and 24 inches long was charged with a hydrogenation catalyst comprising reduced and stabilized promoted cobalt (nominal 60 percent cobalt) on kieselguhr ⅛ inch extrusions supported in the reactor on a perforated platform.

The unit was closed, purged with nitrogen, then hydrogen, then pressured to reaction pressure of 350 psi with hydrogen, the gas entering at a port just below the catalyst bed. Hot oil at controlled temperature was circulated through the reactor jacket heating the catalyst bed to 100° C. and maintaining it near that temperature as measured by thermocouples inserted in the catalyst bed.

Liquid 1,3-dicyanobutane and diethylamine feed in a mole ratio of 1:4 of 1,3-dicyanobutane to diethylamine were preheated to 100° C. and were each continuously pumped into a common mixing line then into the top of the reactor and allowed to trickle down over the catalyst extrusions (as reductive amination of 1,3-dicyanobutane to 2-methyl-5-diethylaminovaleronitrile proceeded) to form a liquid level of product dissolved in diethylamine just below the catalyst bed. This level was maintained by continuously removing the liquid product solution through a liquid level controller actuated exit valve at a rate essentially equal to the liquid feed rate.

Gas consisting principally of hydrogen, ammonia and diethylamine was continuously removed from the top of the reactor through a control valve and continuously pumped through a bed of solid particulate anhydrous calcium chloride to continuously selectively remove ammonia from the gas stream. This gas stream was then continuously replenished with hydrogen at system pressure and continuously pumped back into the reactor through the port just below the catalyst bed.

The liquid product after removal of diethylamine solvent was analyzed by gas liquid chromatography as described in Example 1 and was found to contain predominantly 2-methyl-5-diethylaminovaleronitrile.

Having regard to the foregoing disclosure, the following is claimed as the inventive and patentable embodiments thereof:

1. An improved continuous cyclic process for preparing secondary amines, secondary polyamines, tertiary amines or tertiary polyamines by the catalystic reductive amination of nitriles, which comprises continuously hydrogenating a nitrile in the presence of a hydrogenation catalyst and an amine reactant selected from the group consisting of primary amines and secondary amines, to form a gas phase which comprises by-product ammonia, unreacted volatile amine and unreacted hydrogen, and a liquid phase which comprises secondary and/or tertiary amine product corresponding to the amine reactant, unreacted amine dissolved in the liquid phase, unreacted nitrile and catalyst, continuously removing ammonia from the reaction mixture during the reaction by continuously sweeping out the gas phase containing ammonia and contacting the gas phase with a particulate solid absorbent which is selectively reactive with ammonia and inert to the unreacted volatile amine and unreacted hydrogen, continuously recycling the separated amine and hydrogen reactant gases to the liquid phase of the reaction mixture, where together with the feed they replenish hydrogen and volatile amine reactant in the reaction mixture and sweep dissolved ammonia from the reaction mixture, to maintain the reaction mixture substantially free from ammonia, favoring the formation of the desired secondary amine or tertiary amine product and inhibiting the formation of undesirable primary amines, and continuously recovering secondary amine and/or tertiary amine product from the reaction mixture.

2. A process in accordance with claim 1 wherein the nitrile is a mononitrile.

3. A process in accordance with claim 1 wherein the nitrile is a dinitrile.

4. A process in accordance with claim 1 wherein the nitrile is a polynitrile.

5. A process in accordance with claim 1 wherein the amine reactant is a primary amine.

6. A process in accordance with claim 1 wherein the amine reactant is a secondary amine.

7. A process in accordance with claim 1 wherein the amine reactant is a primary or secondary poly-amine.

8. A process in accordance with claim 1 wherein the nitrile is 1,3-dicyanobutane.

9. A process in accordance with claim 1 wherein the nitrile is α-methylene glutaronitrile.

10. A process in accordance with claim 1 wherein the amine is diethylamine, ethylamine, methylamine or dimethylamine.

11. A process in accordance with claim 1 wherein the absorbent is an anhydrous neutral salt capable of forming an ammoniate or ammine with gaseous ammonia.

12. A process in accordance with claim 1 wherein the absorbent is calcium chloride.

13. A process in accordance with claim 1 including the step of fractionally distilling the secondary amine and/or tertiary amine product to recover the secondary amine and/or tertiary amine substantially free of reactant.

14. A process in accordance with claim 1 wherein the liquid reactants are allowed to trickle over the supported hydrogenation catalyst and the continuous phase is gaseous.

15. A process in accordance with claim 1, wherein the amine reactant is formed during the hydrogenation of a dinitrile reactant in situ in the reaction mixture.

16. A process in accordance with claim 1, wherein the nitrile reactant is a polynitrile of the formula $$\left[ \begin{array}{c} C \\ | \\ -C-R^4- \\ | \\ R \end{array} \right]_{n^2}$$

wherein R and $R^4$ are organic radicals having from one to about 30 carbon atoms and $n^2$ is 2 to 40.

17. A process in accordance with claim 1 wherein the amine reactant is employed in an amount within the range from about 1 to about 16 moles per mole of nitrile.

* * * * *